United States Patent Office 3,051,594
Patented Aug. 28, 1962

3,051,594
POLYMETHYLENE TEREPHTHALATE FIBER COATED WITH POLYMERIZED TRIALLYL CYANURATE
Roger Gordon Aitken, St. Hilaire Station, Quebec, Canada, assignor to Canadian Industries Limited, Montreal, Quebec, Canada, a corporation of Canada
No Drawing. Filed June 8, 1959, Ser. No. 818,571
Claims priority, application Canada June 28, 1958
3 Claims. (Cl. 117—138.8)

This invention relates to articles made of rubber or rubber-substitutes reinforced with filaments, fibres, yarns, fabrics and the like derived from aromatic polyesters, and provides a composition and a method for treating such fibrous material to improve its adhesion to rubber or rubber-substitutes.

There have already been many proposals for reinforcing articles made of rubber or rubber-substitutes, hereinafter referred to as rubber articles, with filaments, fibres, yarns, fabrics and the like of many materials such as cotton, rayon, nylon and silk. These reinforced rubber articles have been used in the manufacture of articles of all kinds such as tires, transmission belts, conveyor belts, hose, balloons, and other such articles which are generally subjected to more or less severe service conditions.

Because of outstanding properties as regards, for example, tensile strength and flex-, heat- and tear-resistance it has also previously been proposed to reinforce rubber articles with filaments, fibres, yarns, fabrics and the like, hereinafter referred to as fibrous material, derived from the aromatic highly polymeric linear esters generally known as polymethylene terephthalates. It has, however, not been possible hitherto to bond satisfactorily these polyesters to rubber articles. On the one hand, bonding agents such as vinyl pyridine copolymer latex-resorcinol-formaldehyde dispersions, which have proven technical merit for bonding rubber articles to a variety of materials useful for reinforcing rubber articles such as fabrics obtained from certain polyamide fibres, give unsatisfactory results with these polymethylene terephthalates. On the other hand, bonding agents based on polyisocyanate adhesives with which polymethylene terephthalates may be firmly bonded to rubber articles, have not found acceptance in industry for a variety of reasons, such as toxicity problems of the adhesive and problems associated with the solvents required by the adhesive.

As used in this specification and the claims thereto the term polymethylene terephthalates includes all those polymeric esters which are obtainable by heating gylcols of the series $HO(CH_2)_nOH$, where $n$ is an integer from 2 to 10, with terephthalic acid or mixtures thereof with isophthalic acid under conditions which yield the esters in a highly polymerised condition. In place of the terephthalic acid or isophthalic acid or both and ester-forming derivatives thereof, for example, an aliphatic (including cycloaliphatic) or aryl ester or half-ester, an acid halide or an ammonium or an amine salt, may be used.

It has now been found that fibrous material derived from polymethylene terephthalates can be satisfactorily bonded to rubber articles, and thus be used commercially for reinforcing such rubber articles if triallyl cyanurate is used in the bonding operation.

Triallyl cyanurate has previously been proposed for use as a solvent, plasticiser, insecticide and bactericide. In admixture with resins or in copolymeric form with compounds such as unsaturated alkyd resins, polymerised triallyl cyanurate has also previously been proposed for use as adhesive and is known to have properties which render it valuable in the plastic or coating arts. It is, however, quite surprising that polymerised triallyl cyanurate can be instrumental in solving the problem which has now been solved by the present invention.

Polymerised triallyl cyanurate will, by itself, not bond satisfactorily rubber articles and fibrous material derived from polymethylene terephthalates. In conjunction with a coating of a vinyl pyridine copolymer latex-resorcinol-formaldehyde dispersion also applied to the fibrous material, the polymerised triallyl cyanurate will, however, convert the unsatisfactory bond of either of the two agents into one which is satisfactory beyond expectations.

According to the present invention, therefore, a method of reinforcing rubber articles with fibrous material derived from polymethylene terephthalates is provided which includes the steps of applying to the fibrous material two coatings, one of a composition comprising triallyl cyanurate, the other of a composition comprising a vinyl pyridine copolymer latex-resorcinol-formaldehyde dispersion, polymerising the triallyl cyanurate, and subsequently bonding the fibrous material so treated to the rubber.

The bond between the fibrous material and the rubber is generally effected by a treatment akin to vulcanisation, that is the fibrous material having two coatings, one including polymerised triallyl cyanurate and the other vinyl pyridine copolymer latex-resorcinol-formaldehyde compound, and the rubber have to be heated together, if desired under pressure. It may be further strengthened by incorporating polymerised vinyl chloride in the composition comprising triallyl cyanurate. This polymerised vinyl chloride may be plasticised and may be a homopolymer or a copolymer of vinyl chloride, and up to 90% thereof may be included in the composition comprising the triallyl cyanurate.

It is generally advantageous to apply to the fibrous material first the coating of the composition comprising triallyl cyanurate and polymerising the triallyl cyanurate before the composition comprising the vinyl pyridine copolymer latex-resorcinol-formaldehyde dispersion is applied. The polymerisation of the triallyl cyanurate may be facilitated by any catalyst known in vinyl polymerisation reactions and therefore catalysts such as, for example, symmetrical diacyl peroxides like lauroyl peroxide or benzoyl peroxide, terpene peroxides like ascaridole, and dialkyl peroxides like di-(tert.butyl)-peroxide are useful. Cumene hydroperoxide is a preferred catalyst.

Only small amounts of the catalyst are required. Generally from 0.1 to 0.75% by weight of composition are sufficient to effect polymerization of the triallyl cyanurate in reasonable time. Moreover, the speed of polymerization may be increased considerably by the use of a catalyst accelerating system. Thus, with about 0.5% by weight of the composition of mixed catalyst comprising, for example, cumene hydroperoxide, aluminum chloride and an amine component the triallyl cyanurate may be polymerised in 20 seconds at a temperature of about 200° C.

The application of the coatings to the fibrous material may be effected in any suitable manner. It is generally preferred to apply the coating by dipping the fibrous material, loose or under tension, into the treating compositions. The coating compositions can, however, also be applied by spraying or brushing. If the desired amount of coating, that is an amount of composition leaving at least 1% and preferably from 3 to 25% of solid coating by weight of the fibrous material, is not obtained in one application, the composition can be applied again or as many times as desired in order to bring the amount of coating to the desired level.

So that those skilled in the art may still better understand the present invention the following examples are given by way of illustration, and not by way of limitation. Other ways of carrying the invention into effect will readily be apparent. All parts are parts by weight.

Example I

A rubber-coated fabric made of polyethylene terephthalate filament yarn was prepared as follows.

A mixture of:

| | Parts |
|---|---|
| Finely divided polyvinyl chloride (Geon 121) | 100 |
| Diethylhexyl phthalate | 60 |
| Triallyl cyanurate | 32 |
| Cumene hydroperoxide | 1 | was brushed in a thin layer (about 1 mm.) on a piece of the fabric. The fabric so coated was heated for five minutes at 200° C. A coating of vinyl pyridine copolymer latex-resorcinol-formaldehyde aqueous dispersion containing about 20% solids was then applied to the fabric. This aqueous coating was dried at 175° C. for 20 seconds. A piece of compounded G.R.S. rubber stock was then vulcanized to the coated fabric. A strip of the rubber-coated fabric was cut one inch wide and the force required to separate the rubber from the fabric was determined. When the force applied reached 50 pounds the rubber tore while part of the rubber remained firmly bonded to the fabric.

A similar experiment was carried out in which the triallyl cyanurate-containing coating was omitted. The rubber separated from the fabric with a force of 6 to 7 pounds, thus demonstrating the efficiency of the new bonding system.

Example II

The preparation of polyethylene terephthalate tire cord requires that the cord should be heat set to remove any tendency to stretch under load or to shrink during the vulcanizing of the rubber. This is accomplished by heating the cord under tension for a period of about ½ minute at a temperature of 200° C. and it is advantageous to combine this heat setting operation with the polymerisation of the triallyl cyanurate.

The tire cord used in this example was made from polyethylene terephthalate by spinning a 48-filament yarn of this polyester, drawing this yarn, twisting 4 of these singles into a ply and finally doubling 2 of these plies into cord having a resultant denier of approximately 2100.

An intimate mixture was prepared from

| | Parts |
|---|---|
| Finely divided polyvinyl chloride (Geon 121) | 100 |
| Diethyl hexyl phthalate | 60 |
| Triallyl cyanurate | 32 |
| Cumene hydroperoxide | 1 |
| Saturated solution of aluminum chloride in carbon tetrachloride | 0.5 |
| 15% solution of the free base of "Arquad 18" in isopropanol | 0.5 | and the tire cord was dipped into this mixture allowing about 7% of the mixture, by weight of the cord, to remain on the cord. Excess of the mixture was removed and the cord heated at 200° C. for 20 seconds while the cord was held under tension.

A coating of vinyl pyridine copolymer latex-resorcinol-formaldehyde aqueous dispersion was then applied to the cord and dried at 175° C. for 20 seconds. Thereafter, the cord was incorporated in a G.R.S. rubber tire carcass stock by the usual process.

The result of static tests using the "H" type single cord adhesive method showed a bond strength of 20 pounds. A cord treated with the vinyl pyridine copolymer latex-resorcinol-formaldehyde dispersion only, and vulcanised as above, failed in the above test at 7½ lbs. A cord treated only with the mixture including the triallyl cyanurate and tested as above, failed already at 4½ lbs.

In the two examples the vinyl pyridine copolymer latex-resorcinol-formaldehyde dispersion was prepared as follows:

To 38 parts of "Gentac" grand polyvinyl pyridine latex was added a solution of

| | Parts |
|---|---|
| Water | 56 |
| Resorcinol | 2.2 |
| Formaldehyde (37%) | 3.5 |

The pH of the mixture was adjusted to 9.0 with 10% sodium hydroxide solution. The dispersion was aged for 24 hours before using.

In the above two examples the G.R.S. rubber may be replaced with any other rubber such as, for example, natural rubber, butyl rubber or chloroprene, commonly bonded to rayon or nylon type materials.

What I claim is:

1. Fibrous material derived from polymethylene terephthalates coated with a composition containing polymerized triallyl cyanurate and from 50% to 90% by weight of a vinyl chloride polymer.

2. Fibrous material as claimed in claim 1 wherein the proportion of polymerized triallyl cyanurate in the coating lies between 10% and 50% by weight.

3. Fibrous material as claimed in claim 1 wherein the coating includes about 60% by weight of diethyl hexyl phthalate plasticizer, based on the weight of the vinyl chloride polymer.

References Cited in the file of this patent

UNITED STATES PATENTS

| 2,510,503 | Kropa | Oct. 2, 1946 |
| 2,652,353 | Wilson | Sept. 15, 1953 |
| 2,707,177 | Skiff | Apr. 26, 1955 |
| 2,773,795 | Reynolds | Dec. 11, 1956 |